Figure 1:
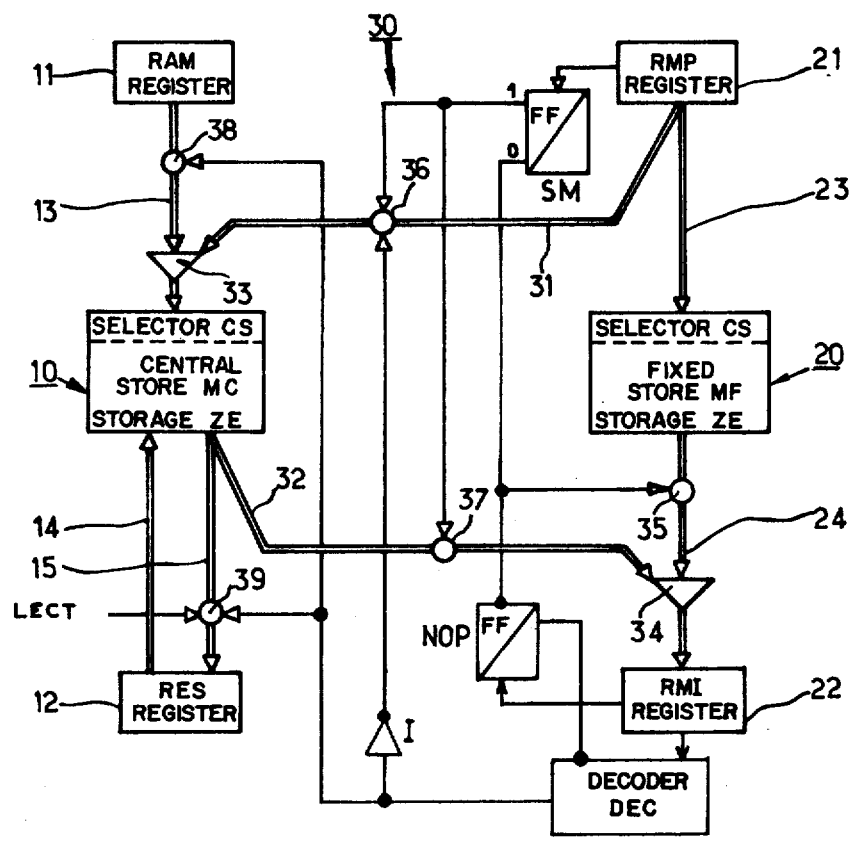

United States Patent [19]
Dalmasso

[11] 3,964,027
[45] June 15, 1976

[54] APPARATUS AND METHOD FOR RECORDING AND USING MICROPROGRAMMES IN A DATA PROCESSING SYSTEM

[75] Inventor: Ginette Laure Dalmasso, Bagnolet, France

[73] Assignee: Compagnie Honeywell Hull (Societe Anonymw), Paris, France

[22] Filed: Apr. 10, 1974

[21] Appl. No.: 459,842

[30] Foreign Application Priority Data
Apr. 19, 1973 France .............................. 73.14402

[52] U.S. Cl. .......................................... 340/172.5
[51] Int. Cl.² .......................................... G06F 9/06
[58] Field of Search ................................ 340/172.5

[56] References Cited
UNITED STATES PATENTS

| | | | |
|---|---|---|---|
| 3,646,522 | 2/1972 | Furman et al. | 340/172.5 |
| 3,736,563 | 5/1973 | Beckinger et al. | 340/172.5 |
| 3,768,075 | 10/1973 | Reitsma et al. | 340/172.5 |
| 3,792,441 | 2/1974 | Wymore et al. | 340/172.5 |
| 3,859,636 | 1/1975 | Cook | 340/172.5 |

*Primary Examiner*—David H. Malzahn
*Attorney, Agent, or Firm*—L. P. Elbinger

[57] ABSTRACT

The invention relates to the recording and use of microprogrammes which may be stored either in a fixed control store or the central store of a processer.

Microinstructions of the same format, which may be stored either in the static store or the central store, are carried out in the same way with no excess cycles.

9 Claims, 5 Drawing Figures

FIG. 2.

| Cycle | C | C+1 |
|---|---|---|
| | ←—T—→ | |
| R M I | [n] | [n+1] |
| R M P | n+1 | n+2 |
| Function | μF(n) | μF(n+1) |
| Read | [n+1] | [n+2] |
| Calculate | n+2 | n+3 |

CASE A

FIG. 3.

| Cycle | C | C+1 | C+2 |
|---|---|---|---|
| | ←—T—→ | | |
| R M I | [n] | [n+1] | [B] |
| R M P | n+1 | B | B+1 |
| Function | Branch. | μF(n+1) | μF(B) |
| Read | [n+1] | [B] | [B+1] |
| Calcuate | B | B+1 | B+2 |

CASE A'

FIG. 4.

| Cycle | K | K+1 |
|---|---|---|
| | ←—T'—→ | |
| R M I | [n] | [n+1] |
| R M P | n+1 | n+2 |
| Function | μF(n) | μF(n+1) |
| Read | [n+1] | [n+2] |
| Calculate | n+2 | n+3 |

CASE B

FIG. 5.

| Cycle | K | K+1 | K+2 |
|---|---|---|---|
| | ←—T'—→ | | |
| R M I | [n] | ? | [n+1] |
| R M P | n+1 | n+1 | n+2 |
| Function | ØM | NOP | μF(n+1) |
| Read | - | [n+1] | [n+2] |
| Calculate | - | n+2 | n+3 |

CASE B''

APPARATUS AND METHOD FOR RECORDING AND USING MICROPROGRAMMES IN A DATA PROCESSING SYSTEM

The present invention relates to data processing, and more particularly to the use of microprogramming techniques in a processor or other system which has a central store.

It is known that a processor operates by carrying out basic operations in a sequential fashion in members such as registers, logic networks, as well as circuits for transferring data between them. These basic operations are usually organised into sequences which may correspond to one and the same instruction for example, and they are carried out in the course of a number of consecutive basic cycles under the control of control operators, which may be produced either in a wired form or by using the technique known as microprogramming.

This technique, which gives great flexibility in design and operation, consists in producing the control operators in the form of so-called control store which, when each basic cycle takes place, supplies an instructional word termed a microinstruction which on the one hand defines the basic operations to be carried out by specified members and on the other hand contains the information required to calculate the address of the next microinstruction, which calculation may possibly be subject to certain conditions. The contents of such a control store, which are formed by an organised sequence of such microinstructions, is termed a microprogramme.

Initially, control stores were formed by fixed stores termed "read only" stores, the contents of which could not be altered. The manner of use and the field of application of a processor which had been microprogrammed using such fixed control stores were thus fixed. To overcome this drawback, it soon proved useful to take advantage of technological process, particularly in the field of integrated circuits, to record the microprogrammes in modifiable stores, the contents of which could be altered at will to suit the system configuration, the requirements of processing, or the envisaged application, but the capacity of which was necessarily small. This being so, there were two possible solutions:

to use a single control store comprising, on the one hand, a fixed section intended to contain the microprogramme which brought about the initial infeed and, one the other hand, a modifiable section intended to receive, at the time when the initial setting operation took place the microprogrammes appropriate to the processing to be carried out.

or, in a processor which contained a central store, to use part of the latter to store extensions of microprogrammes which were themselves stored in a fixed store.

The invention employs this second solution under conditions such as will overcome the drawbacks inherent in embodiments already known.

Among these drawbacks, the principal one is the relatively slow speed at which the microprogrammes recorded in the central store are carried out. In effect, due to its capacity and its technical nature, the cycle duration of this store is usually distinctly longer than the basic cycle time of the processor since, in the main, the latter employs high-speed active components. Furthermore, access is gained to a microinstruction recorded at a given location in the central store in the same way as to data recorded at other locations, by the execution of a microinstruction which is itself recorded in the fixed store. The result is that the execution of a microinstruction recorded in the central store calls for a number of machine cycles to elapse, which cycles are themselves prolonged by the intervention of the central store. The overall result is that execution is very slow.

What is more the microprogrammes contained in the fixed store and the central store are neither recorded nor carried out in the same way and in particular do not behave in the same fashion in case of connections or interruption. A corollary of this is that a microprogramme written for the fixed store cannot be recorded as it is in the central store, and vice versa, which causes serious problems if the system is re-structured.

The invention therefore has as an object to overcome the drawbacks mentioned above by providing an apparatus and a method for microprogamming, the use of which enables on the one hand the same microprogramme to be recorded either in the fixed store or the central store, depending on the configuration of the system, and on the other hand ensures that a microprogramme recorded in the central store is carried out as quickly as possible, in such a way that the relative prolongation of the time taken to carry out such a programme depends only on the ratio between the cycle times of the central store and of the fixed store, these being governed by the technical natures of the respective stores.

To this end, the apparatus according to the invention is chiefly characterised in that it comprises, in combination:

a control store which is formed in a manner known per se from at least one fixed store and a section of the central store, and in which the microinstructions are recorded in the same format, a register for microinstruction addresses the output of which is connected to the selector circuits of the fixed store and of the central store, a microinstruction register the input of which is connected to the output of the fixed store and to that of the central store, and switching means the switched position of which is changed selectively as a function of the contents of the microinstruction address register and which are arranged so as to render conductive the connections between on the one hand the said microinstruction address register and the store concerned, and between on the other hand the output of this same store and the microinstruction register, and possibly so as to break at least certain other connections.

In this way, all the microinstructions, which are read into one or other of the stores depending on their addresses, are not only of identical form but are also fed into the same register and are then carried out under the same conditions. The only difference between the ways in which microinstructions originating from the two sources are carried out thus lies in the different cycle times of the two stores.

In accordance with a preferred embodiment of the apparatus, the aforementioned switching means comprises a bistable flip-flop associated with the microinstruction address register which is switched to one or other of its stable states in response to the contents of the said register, and gate circuits such as AND functions which control the aforementioned connections and which are selectively made conductive or kept blocked depending on the state of the said flip-flop.

The switching means produced in this way thus comprises merely simple and reliable active circuits which are easily adapted to the method of transmission employed, and in particular to high-speed switching, with the result that their presence causes scarcely any complication in the system and does not substantially worsen the cycle time.

In order to avoid the routine operation of the central store being interfered with by the execution of a microinstruction which requires action on the part of the store, the aforementioned switching means advantageously includes a decoder associated with the microinstruction register which, if the microinstruction contained in the said register calls for an operation to take place in the central store, activates gate circuits, such as AND functions, which are thus made conductive so as to allow the said central store to communicate with its own address and input/output registers.

The invention further has as an object a method of making use of the apparatus described above, which method is mainly characterised in that, during the cycle of execution of a microinstruction (n) contained in the microinstruction register, on the one hand the address of the next microinstruction (n+1) is read out from the microinstruction address register and transmitted by the switching means to the selector circuits of the appropriate store, and on the other hand the address of the next following microinstruction (n+2) is calculated, and in that, at the conclusion of this cycle, on the other hand the next microinstruction (n+1) is read out from the said store and transferred by the switching means to the instruction register, and on the other hand the address of the said next following microinstruction (n+2) is fed into the micro-instruction address register.

In this way, any microinstruction generally only requires a single cycle for its execution, the duration of this cycle being chiefly determined by the access time to the store in question. Only microinstructions which call for connections to be made or an operation to take place in the central store need an extra cycle, but in practice such exceptions scarely affect the performance of the system.

The invention will now be further described by way of example, with reference to the following description of a non-limiting embodiment, which is illustrated in the accompanying drawings, in which:

FIG. 1 is a block diagram of an apparatus according to the invention for recording and carrying out microprogrammes, and FIGS. 2 to 5 are timing diagrams illustrating different ways in which the apparatus of FIG. 1 operates.

The block diagram in FIG. 1 is a schematic view of the components and circuits of a microprogramming apparatus according to the invention which is incorporated in a processor of which only the members directly affected by the invention are shown. It is of course understood that the processor in question includes, over and above the members shown and described, at least one arithmetic logic unit, an input and output unit which is associated with peripheral equipment and a control unit which coordinates the operation of these members as a whole.

In FIG. 1, block 10 represents the central store MC of the processor, which is necessarily addressable and modifiable but which may take any technical form whatever and may for example employ ferrite ring stores, magnetised needles or even integrated circuits. This central store is normally used to store data such as working and operating programmes, the data to be processed and intermediate results, and to bring about all the exchanges of data required with the other units in the processor.

Blocks 11 and 12 represent two registers which are associated with the central store MC for this purpose. The first register 11, termed the "store address register" RAM, is connected to selection circuits CS of the central store and contains the address of the location in the recording area ZE to which access is required. This register is therefore connected to the store only by a single unidirectional connection 13. The second register 12, termed the input/output register RES, is connected to the recording area ZE of the store by two connections 14, 15, which respectively allow an information item previously fed into the said register to go into store and an information item read out from the store to be stores in the said register.

Block 20 represents a fixed store MF which is addressable but not erasable, (i.e. it is of the "read-only" type) which may be formed from wired operators for example. Each location in the recording area ZE of this fixed store MF contains a microinstruction, that is to say an instructional word which on the one hand defines a group of basic operations to be carried out by duly identified basic members in the processor, and which on the other hand contains the information required to calculate the address of the next microinstruction and/or information for making a decision, for example to carry out a connecting operation or a test, or to initiate a loop or sub-routine. The fixed memory MF thus contains ordered sequences of such microinstructions, these sequences forming an equal number of microprogrammes which will be carried selectively by the processor when called up by instructions contained in the operating programme.

Blocks 21 and 22 represent two registers which are associated with the fixed store MF for this purpose. The first register 21, termed the "microprogramming register" RMP, is connected to selector circuits CS of the fixed store and contains the address of the microinstruction to which access is required. This register is therefore connected to the fixed store by only a single unidirectional connection 23. The second register 22, termed the "microinstruction register" RMI, is connected to the recording area ZE of the fixed store MF by a single unidirectional connection 24 which enables the microinstruction read out from the store to be fed to the said register.

The members which have just been described and their mutual functions are well known from the prior art and will not therefore be described in any greater detail, particularly since they do not form the subject of the invention proper but are simply means of which it makes use.

The object of the invention proper lies in effect in creating specific relationships between these members by means of a group 30 of connections and switching means.

In essence, this group comprises a first connection 31 which connects the output of the microprogramming register RMP to the selector circuits CS of the central store MC, a second connection 32 which connects the output of the recording area ZE of the central store to the input of the microinstruction register RMI, and a store-selecting flip-flop SM associated with the microprogramming register RMP to control various gate circuits inserted in the aforementioned connections.

To be more exact, the two connections 13, 31 which originate respectively from store address register RAM and microprogramming register RMP are connected to the input of the selector circuits CS of the central store MC by gate circuits 33 which exercise an OR Function, symbolised by a triangle. Similarly, the two connections 24, 32 which originate from the recording areas ZE of central store MC and fixed store MF respectively are connected to the input of the microinstruction register RMI by gate circuits 34 which also exercise an OR function. The store-selecting flip-flop SM is formed by a bistable circuit which, depending upon whether its control input receives a true or false signal is either changed to the activated state or is returned to the quiescent state, for which its 1 or 0 outputs are validated respectively. It will be assumed that the control signal in question is false when the microprogramming register RMP contains an address in the fixed store and conversely is true when the said register contains an address in the central store.

Adopting this hypothesis, the 0 output of the store-selecting flip-flop SM is connected to gate circuits 35 which exercise an AND function (symbolised by a circle) and which control the connection 24 between the fixed store and the microinstruction register RMI. In this way, when the microprogramming register RMP contains an address in the fixed store and the 0 output of flip-flop SM is true as a consequence, the gate-circuits 35 are made conductive and enable the microinstruction recorded at the specified location in the fixed store to be transferred via connection 24 to microinstruction register RMI.

The 1 output of the store-selecting flip-flop SM is connected to gate-circuits 36, 37 which exercise an AND function and which control respectively the connection 31 between the microprogramming register RMP and the selector circuits CS of the central store MC, and the connection 32 between the recording area ZE in the latter and the microinstruction register RMI. In this way, when the microprogramming register RMP contains an address in the central store and the 1 output of flip-flop SM is true as a consequence, gate-circuits 36 are made conductive and allow this address to be transmitted to the central store via connection 31, while gate-circuits 37, which have also been made conductive, allow the information read out from the store at this address to be transferred to microinstruction register RMI via connection 32.

Thus, group 30 enables information read out either from the fixed store MF or from the central store MC to be fed into register RMI. An area in the central store may therefore be alloted to recording microinstructions having the same format as those recorded in fixed store MF. This being so, microinstructions from either source may be carried out under exactly the same conditions, the only difference lying in the differing lengths of the cycles required for access to microinstructions recorded in the fixed store and in the central store, these being due to the differing technical natures of the stores.

This means that group 30 enables the central store MC to be used to record extensions of the microprogrammes contained in the fixed store MF, or indeed self-contained micro-programmes which may be altered to suit the structure of the processor and the use to which it is put.

So that the normal operation of the said store MC will not be interfered with when it exercises this function, and so that microinstructions which call for an operation to take place in this same central store may be carried out, group 30 includes supplementary members, namely: gate-circuits 38, 39 which exercise an AND function and which control the connections 13, 14 between the central store MC and the address register RAM and input/output register RES respectively, as well as a decoder DEC associated with the microprogramming register RMI the output of which is validated only when the register contains a microinstruction in the execution of which the central store MC plays a part. Gate circuits 38, 39 are directly connected to the output of decoder DEC, and an inverter I connects the decoder to gate circuits 36 which control the connection 31 between the microprogramming register RMP and the central store MC. In this way, any microinstruction which calls for an operation to take place in the central store MC connects the latter to its address register RAM and its input/output register RES, but at the same time isolates the said store from the microprogramming register RMP. Flip-flop SM and decoder DEC thus ensures that is impossible for the two stores respectively to be addressed from the microprogramming register RMP or to read out to the microinstruction register RMI.

Finally, a "No Operation" flip-flop NOP, which is normally kept in the quiescent state by the 0 output of flip-flop SM, is activated by register RMI when the latter contains a microinstruction which calls for an operation M to take place in the central store. The function of flip-flop NOP when activated in this way is to invalidate decoder DEC during the next cycle after the said operation has been carried out.

Having thus described the arrangement and operation of the microprogramming apparatus according to the invention, the way in which it is used will now be described with reference to the timing diagrams in FIGS. 2 to 5.

In all these diagrams, in which time $t$ progresses from the left to the right of the drawing, the top line identifies the cycle which is underway, while the two lines below show respectively the microinstruction which is being carried out, which is contained in register RMI, and the microinstruction address contained in the microprogramming register RMP. Finally, the last three lines show the various tasks carried out by the processor under the control of the microinstruction being carried out, that is to say performing the appropriate microfunction, reading out the next microinstruction, and calculating the address of the next following microinstruction.

The following cases may be identified:
CASE A (FIG. 2):

The microprogramme is recorded in the fixed store (SM=0).

During cycle C, register RMI contains the microinstruction ($n$) being carried out and register RMP contains the address ($n+1$) of the next microinstruction. The processor performs the microfunction $\mu F$ ($n$) ordered by microinstruction ($n$) and calculates the address of the next following microinstruction ($n+2$).

At the conclusion of cycle C, the microinstruction ($n+1$) which was read out from the fixed store (SM=0) is fed into register RMI, while the calculated address $n+2$ is fed into register RMP.

In the course of cycle $C+1$, the same operations are repeated with the positions of the addresses and microinstructions increased by one unit.

The duration T of each cycle is the same as the access time of the fixed store and is longer than the time taken to carry out a microinstruction.

CASE A' (FIG. 3):

similar to case A but the microinstruction (n) carried out during cycle C instructs a connecting operation to be carried out.

During cycle C, the connection operation called for by microinstruction (n) contained in register RMI is carried out, or in other words the processor calculates the address B to which the microprogramme should be switched. At the same time, there is read out from the fixed store (SM=0) the next microinstruction, the address of which (n+1) is contained in register RMP.

At the conclusion of cycle C, the microinstruction (n+1) read out from the fixed store is fed into register RMI, while the calculated address B is fed into register RMP.

During cycle C+1, microinstruction (n+1) is carried out, the contents of the fixed store at address B is read out, and the next following address is calculated by the processor.

At the conclusion of this second cycle, the contents (b) of this address is fed into register RMI, while the calculated address B+1 is fed into register RMP.

The connecting operation in question thus calls for the next microinstruction to be carried out, and this may for example instruct intermediate results to be preserved.

CASE B (FIG. 4):

The microprogramme is recorded in the central store (SM=1) and the microinstructions carried out do not call for an operation to take place in the store (M=0).

Operations progress in exactly the same way as in case A, the only difference being that, since the microinstructions are read out from the central store MC, the access time of the latter makes the duration T' of each cycle longer than T achieved when read-out was from the fixed store.

CASE B' (in the case of the store):

Similar to case B, but the microinstruction (n) carried out during cycle K calls for a connecting operation to take place.

The process is identical to that in case A', the only difference being the cycle time T'.

It is clearly apparent from these two cases that a microprogramme stores and used in accordance with the invention will be carried out in exactly the same way whether it is recorded in the fixed store or the central store, and in particular will behave in the same way if a connecting operation or interruption should occur when marking or unmarking takes place. The only difference lies in the performance obtained in the two cases, performances being in the same ratio T/T' as the cycle times and thus as the access times of the fixed and central stores.

CASE B'' (FIG. 5):

Similar to case B but the microinstruction to be carried out calls for an operation to take place in store (M) (DEC is activated).

In this case, where the microinstruction to be carried out is an operational microtype which calls for a central store read-out or read-in cycle to take place, the timing diagram differs from those above and includes an extra cycle.

During cycle K, register RMI contain microinstruction (n) the execution of which calls for a cycle of the central store MC and the contents of register RAM are switched by the decoder to the selector circuits CS of the store, which are isolated from register RMP. If it is a question of a read-in cycle, the contents of register RES are transferred to the store at the address specified by register RAM. If it is a read-out cycle, the contents of the store at this same address are transferred to register RES.

At the conclusion of cycle K, in the course of which no address calculation can take place, the contents n+1 of the microprogramming register RMP remain unaltered for this reason, with the result that the corresponding instruction (n+1) will only be read out in the course of cycle K+1 and carried out in the course of cycle K+2. In addition, flip-flop NOP, which is activated, gives an output which invalidates decoder DEC, with the result that no function is performed by the processor during cycle K+1.

In this particular instance, the execution .F microinstruction (n) (which requires one cycle of the central store) and access to the next microinstruction thus require two consecutive cycles, whereas a single cycle would have been sufficient had the microprogramme been recorded in the fixed store MF.

However, this eventuality occurs fairly rarely in a microprogramme (its relative frequency is approximately 10%) and therefore does not substantially alter the performance of the processor. Furthermore, this occurrance does not hinder the sequential progress of the microprogramme stored in the central store and does not alter the behavior which takes place when interruption occurs, since a microinstruction which calls for an operation to take place in a store does not effect the interruption masks.

The invention is of course in no way limited to the embodiment described and illustrated, which is given only as an example.

I claim:

1. Apparatus for providing the function of a control store of a data processing system, comprising in combination:

a fixed store for holding microinstructions in respective locations thereof;

a central store of said data processing system for holding microinstructions in respective locations thereof;

each of said stores responding to an address received thereby which represents a respective location in said store for delivering at an output connection thereof the microinstruction held in said location;

the microinstructions held in said fixed store and said central store having a common format;

a first register for holding a store address;

first transfer means for transferring the address contents of said first register to said fixed store;

second transfer means; said second transfer means being controllable for transferring the address contents of said first register to said central store;

a second register for holding a microinstruction for controlling a respective operation to be carried out by said data processing system;

third transfer means, said third transfer means being controllable for transferring a microinstruction from said output connection of said fixed store to said second register;

fourth transfer means, said fourth transfer means being controllable for transferring a microinstruction from said output connection of said central store to said second register; and selectively operable switching means coupled to said first register and responsive to the contents thereof for operating in one of first and second states, said switching means when operating in said first state controlling said third transfer means to enable transfer therethrough and when operating in said second state controlling said second and fourth transfer means to enable transfer therethrough.

2. The apparatus of claim 1, wherein said switching means is a flip-flop.

3. The apparatus of claim 1, wherein the contents of said central store are modifiable during normal operation of said data processing system.

4. The apparatus of claim 3, wherein said selectively operable switching means responds to an address representing a location in said fixed store for operating in said first state and responds to an address representing a location in said central store for operating in said second state.

5. The apparatus of claim 3, further comprising a third register for holding a store address and a fifth transfer means, said fifth transfer means being controllable for transferring the address contents of said third register to said central store.

6. The apparatus of claim 5, further comprising a fourth register; a sixth transfer means, said sixth transfer means being controllable for transferring the contents of an addressed location in said central store to said fourth register; and means coupled to sense the microinstruction in said second register and responsive to a predetermined microinstruction in said second register for controlling said fifth and sixth transfer means to enable transfer therethrough.

7. In a data processing system including a central store for said system, said central store being modifiable during normal operation of said system; a microinstruction store, said microinstruction store holding microinstructions in respective locations thereof and being unmodifiable during normal operation of said system; each of said stores responding to an address received thereby which represents a respective location in said store for delivering at an output connection thereof the contents of said location; a first register for holding a store address; and a second register for holding a microinstruction for controlling a respective operation to be carried out in said system; apparatus for providing the function of a control store comprising:

means for loading microinstructions into respective locations of said central store, the microinstructions loaded into said central store and the microinstructions held in said microinstruction store having a common format;

first transfer means for transferring the address contents of said first register to said microinstruction store;

second transfer means, said second transfer means being controllable for transferring the address contents of said first register to said central store;

third transfer means, said third transfer means being controllable for transferring a microinstruction from said output connection of said microinstruction store to said second register;

fourth transfer means, said fourth transfer means being controllable for transferring a microinstruction from said output connection of said central store to said second register; and selectively operable switching means coupled to said first register and responsive to the contents thereof for operating in one of first and second states, said switching means when operating in said first state controlling said third transfer means to enable transfer therethrough and when operating in said second state controlling said second and fourth transfer means to enable transfer therethrough.

8. The apparatus of claim 7, wherein said selectively operable switching means responds to an address representing a location in said microinstruction store for operating in said first state and responds to an address representing a location in said control store for operating in said second state.

9. A method for operating a data processing system which includes a central store for said system, said central store being modifiable during normal operation of said system, and a microinstruction store, said microinstruction store holding microinstructions in respective locations thereof and being unmodifiable during normal operation of said system, each said stores responding to an address received thereby which represents a respective location in said store for delivering the contents of said location; comprising the steps of:

loading microinstructions into respective locations of said central store, the microinstructions loaded into said central store and the microinstructions held in said microinstruction store having a common format;

generating a first address of a microinstruction to be executed, said first address representing a location in said microinstruction store;

delivering said first address to said microinstruction store and receiving therefrom the microinstruction held therein in the corresponding location;

operating said system under control of said microinstruction received from said microinstruction store;

generating a second address of a microinstruction to be executed, said second address representing a location in said central store holding a microinstruction, delivering said second address to said central store and receiving therefore the microinstruction held therein in the corresponding location; and operating said system under control of said microinstruction received from said central store.

* * * * *